(12) United States Patent
Giraud et al.

(10) Patent No.: US 8,591,117 B2
(45) Date of Patent: Nov. 26, 2013

(54) HYDRAULIC CENTER BEARING

(75) Inventors: Alain Rene Regis Giraud, Hessen (DE); Travis Jon Grassmid, Zeeland, MI (US); Donald Paul Price, Farmington Hills, MI (US)

(73) Assignee: Trelleborg Automotive USA, South Haven, MI (US)

( * ) Notice: Subject to any disclaimer, the term of this patent is extended or adjusted under 35 U.S.C. 154(b) by 152 days.

(21) Appl. No.: 13/278,220

(22) Filed: Oct. 21, 2011

(65) Prior Publication Data

US 2012/0097824 A1    Apr. 26, 2012

Related U.S. Application Data

(60) Provisional application No. 61/405,673, filed on Oct. 22, 2010.

(51) Int. Cl.
*F16C 27/00* (2006.01)
*F16C 27/04* (2006.01)

(52) U.S. Cl.
CPC .................................. *F16C 27/045* (2013.01)
USPC .............. 384/536; 384/99; 384/535; 384/581

(58) Field of Classification Search
USPC .................. 384/99, 101, 399–400, 535–536, 384/581–582, 606; 267/219
See application file for complete search history.

(56) References Cited

U.S. PATENT DOCUMENTS

| | | | | |
|---|---|---|---|---|
| 2,155,919 A | * | 4/1939 | Wooler et al. .................. | 384/582 |
| 2,933,354 A | * | 4/1960 | Primeau ......................... | 384/536 |
| 3,140,901 A | * | 7/1964 | Young ............................ | 384/536 |
| 3,704,922 A | * | 12/1972 | Kleinschmidt et al. ........ | 384/582 |
| 4,669,893 A | * | 6/1987 | Chalaire et al. ................ | 384/535 |
| 4,947,639 A | * | 8/1990 | Hibner et al. .................. | 384/535 |
| 4,971,458 A | * | 11/1990 | Carlson ........................... | 384/99 |
| 4,983,051 A | * | 1/1991 | Hibner et al. .................. | 384/399 |
| 5,052,828 A | * | 10/1991 | Ciokajlo et al. .............. | 384/476 |
| 5,380,100 A | * | 1/1995 | Yu ................................... | 384/99 |
| 5,452,957 A | * | 9/1995 | Duggan ......................... | 384/536 |
| 5,501,531 A | * | 3/1996 | Hamaekers .................... | 384/536 |
| 6,536,953 B1 | * | 3/2003 | Cope et al. .................... | 384/536 |
| 6,883,967 B2 | * | 4/2005 | Robb et al. .................... | 384/536 |
| 7,500,788 B2 | * | 3/2009 | Joyner et al. .................. | 384/536 |
| 7,611,288 B2 | * | 11/2009 | Lew ............................... | 384/536 |
| 7,798,720 B1 | * | 9/2010 | Walsh ............................ | 384/99 |
| 2002/0081050 A1 | * | 6/2002 | Cermak ........................ | 384/536 |
| 2008/0056633 A1 | * | 3/2008 | Stout et al. .................... | 384/535 |

FOREIGN PATENT DOCUMENTS

| | | | |
|---|---|---|---|
| JP | 04-106017 U | | 9/1992 |
| JP | 05-041934 U | | 6/1993 |
| JP | 06300037 A | * | 10/1994 |
| JP | 08-028557 A | | 2/1996 |
| JP | 09112549 A | * | 5/1997 |
| JP | 2002-205562 A | | 7/2002 |

* cited by examiner

*Primary Examiner* — Marcus Charles
(74) *Attorney, Agent, or Firm* — Gifford, Krass, Sprinkle, Anderson & Citkowski, P.C.

(57) ABSTRACT

A hydraulic bushing having at least two chambers and at least one channel connecting the chambers. The bushing is made of a high durometer rubber or other polymer to increase durability. The bushing further includes a center bearing press fit in the center of the annular bushing. The bushing is further press fit into an annular seal operable to seal the fluid within the chambers and channels. The bearing, bushing, and seal assembly is then press fit into a bracket which is subsequently mounted to the vehicle. The center bearing is operable to hold the prop shaft wherein the center bearing is free to rotate within the bushing thereby allowing the prop shaft to rotate.

16 Claims, 5 Drawing Sheets

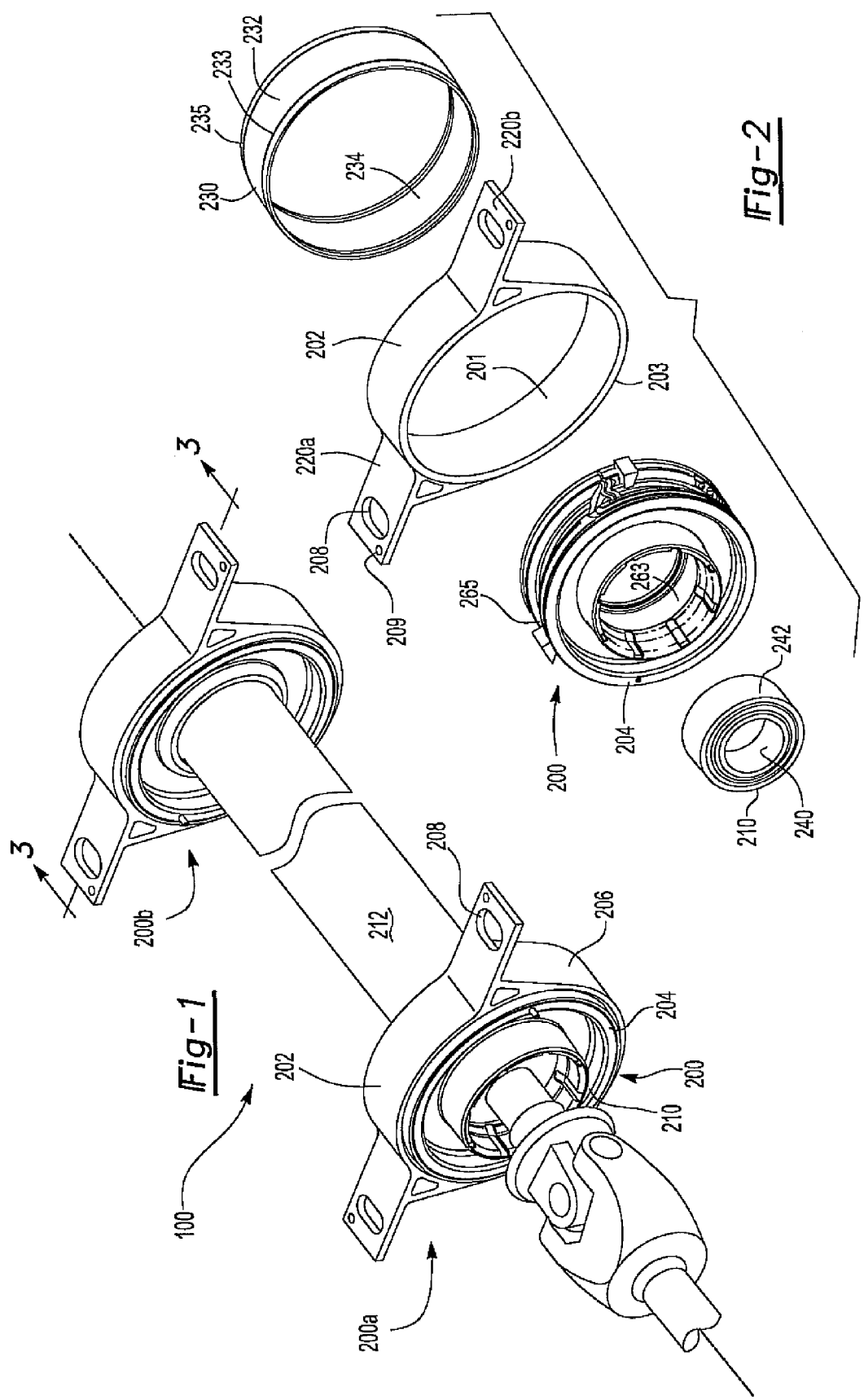

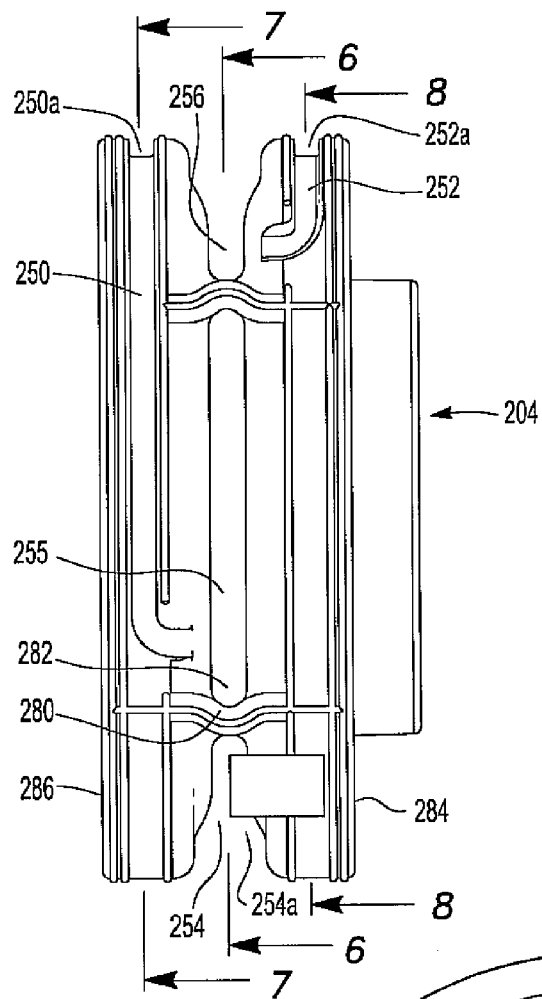
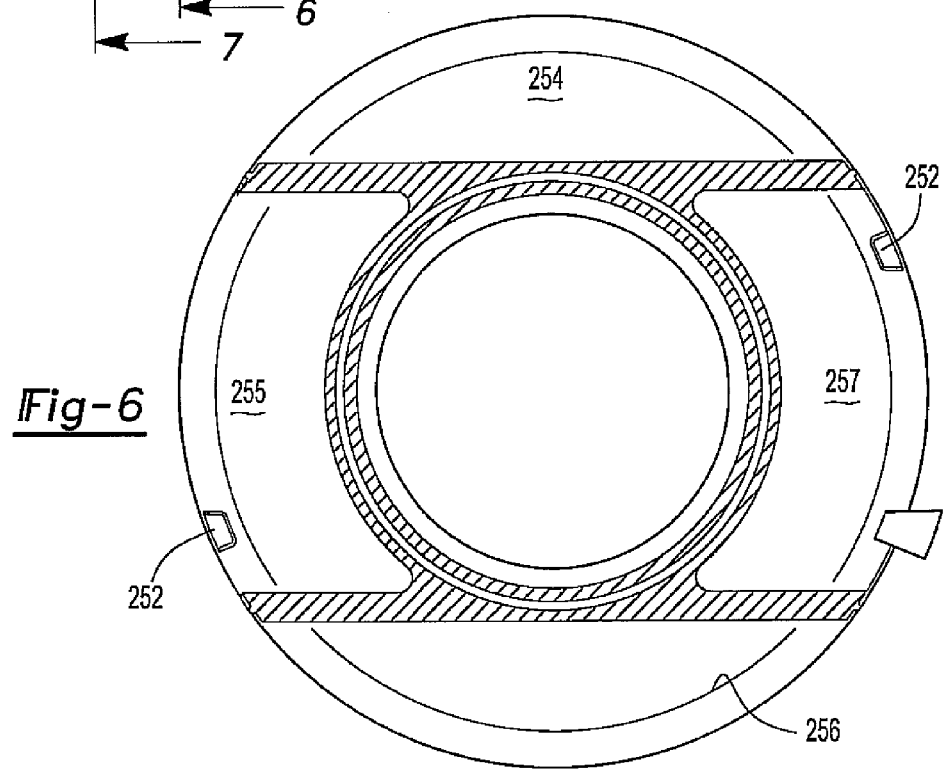
Fig-5
Fig-6

HYDRAULIC CENTER BEARING

CROSS-REFERENCE TO RELATED APPLICATIONS

This application claims priority of U.S. Provisional Patent Application 61/405,673 filed Oct. 22, 2010, the contents of which are incorporated herein by reference.

FIELD OF THE INVENTION

The present invention relates generally to hydraulic center bearings and bushings. More particularly, this invention relates to a hydraulic center bushing having two or four chambers with interconnecting channels.

BACKGROUND OF THE INVENTION

An automotive vehicle utilizes the drive shaft or prop shaft to transfer mechanical energy generated by the engine to the wheels of the vehicle. Prop shafts can either be multi piece or single piece. A drive shaft or prop shaft requires the use of a center support to increase dampening. A center bearing or bushing further reduces and controls the displacement and vibration of the prop shaft due to the balancing and alignment imperfection of the overall vehicle system. The center bearing supports the prop shaft and acts as an isolator against road and other vehicle noises transmitted through the vehicle drive shaft into the vehicle body. The center support is composed of a mount, an inner rubber element (such as a bushing), and an inner element, such as a bearing. Many commonly known bushings are available and widely used. However, these bushings pose many problems with respect to noise and vibration transmitted to the interior of a vehicle where the user of the vehicle is able to hear the vibration.

To reduce the vibration created by the prop shaft, it is known to use a soft rubber for the center bushing to reduce vibration. The soft rubber used in the center bushing dampens the vibration caused by misalignment and movement of the prop shaft. However, the soft rubber of the center bushing is not durable and wears and deteriorates quickly.

As an alternative to soft rubber, it is known to use a rubber of a higher durometer to reduce wear on the center bushing. However, a center bushing with a high durometer (a harder material) creates significantly more noise and vibration which is transferred to the interior of a vehicle. Accordingly, center bushings having a high durometer are not desirable. Accordingly, there exists a need in the art to provide a center bushing and center bearing support system for a prop shaft having high durability while still reducing noise and vibration heard in the interior of a vehicle.

SUMMARY OF THE INVENTION

The present invention provides for a hydraulic bushing having at least two chambers and at least one channel connecting the chambers. The bushing is made of a high durometer rubber or other polymer to increase durability. The bushing further includes a center bearing press fit in the center of the annular bushing. The bushing is further press fit into an annular seal operable to seal the fluid within the chambers and channels. The bearing, bushing, and seal assembly is then press fit into a bracket which is subsequently mounted to the vehicle. The center bearing is operable to hold the prop shaft wherein the center bearing is free to rotate within the bushing thereby allowing the prop shaft to rotate.

Fluid is located within a closed system of the at least two chambers and at least one channel of the bushing. Fluid is free to move from a first chamber to a second chamber by means of a channel in accordance with the movement of the prop shaft. As the prop shaft moves to misaligned positions, the bushing of the present system also compresses, contracts, and otherwise moves thereby forcing the fluid volume to transfer to the other chambers. If the center bushing has four chambers, displacement and vibration are reduced in both the vertical and lateral directions. For displacement in the vertical direction, a volume of fluid is transferred from the large chambers. If there is displacement in the lateral direction, fluid is only transferred to and from the small chambers. The transfer of fluid from the chambers greatly reduces noise and vibration created from any displacement or misalignment of the prop shaft.

BRIEF DESCRIPTION OF THE DRAWINGS

FIG. 1 illustrates a perspective view of the center supports holding a prop shaft;

FIG. 2 illustrates an exploded perspective view of the center support;

FIG. 5 illustrates a side view of the rubber bushing;

FIG. 6 illustrates a cross-sectional view of the rubber bushing along the sectional line 6-6;

DETAILED DESCRIPTION OF THE DRAWINGS

Figure 3:
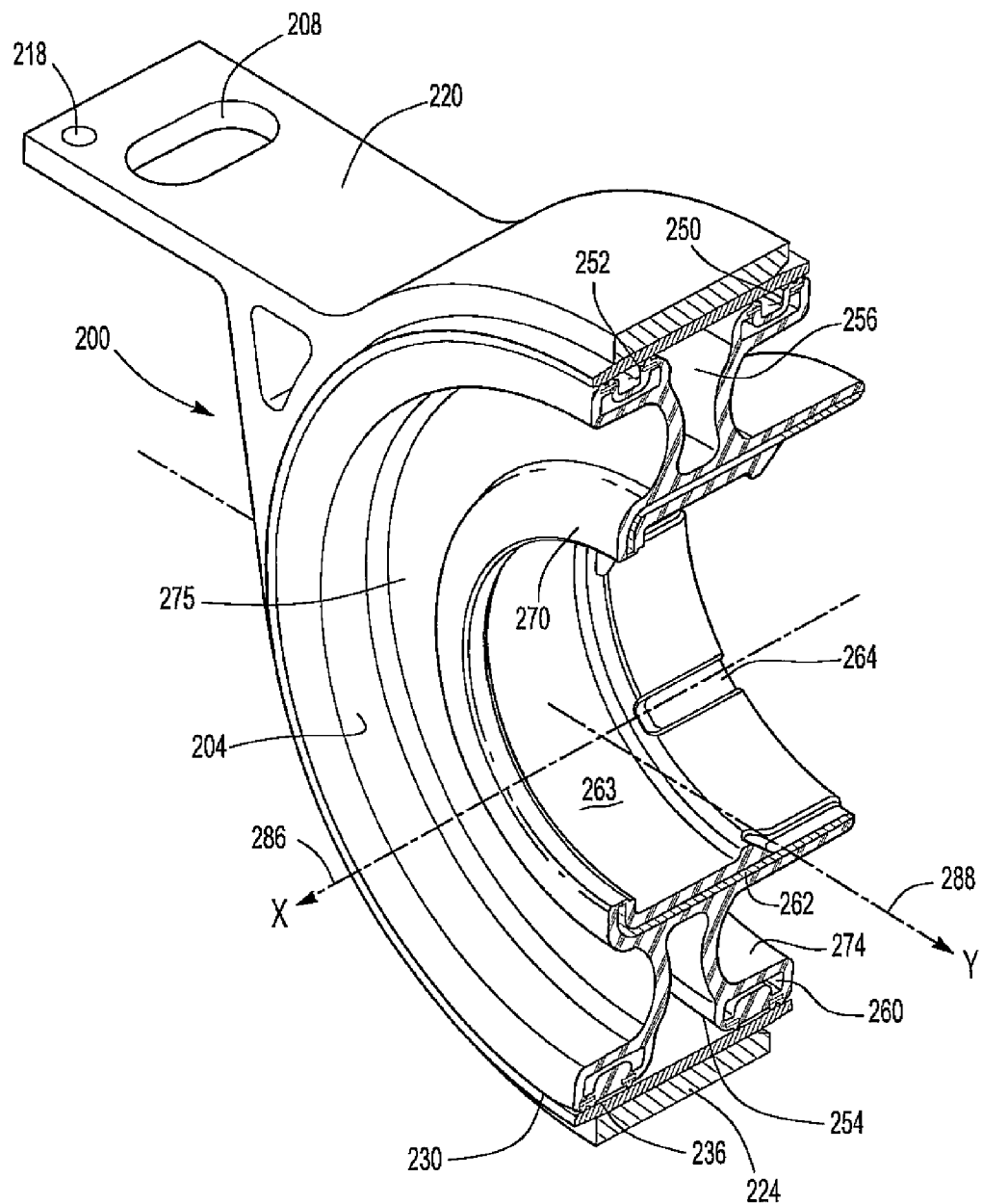
FIG. 3 illustrates a cross-sectional perspective view of the center support.
Figure 4:
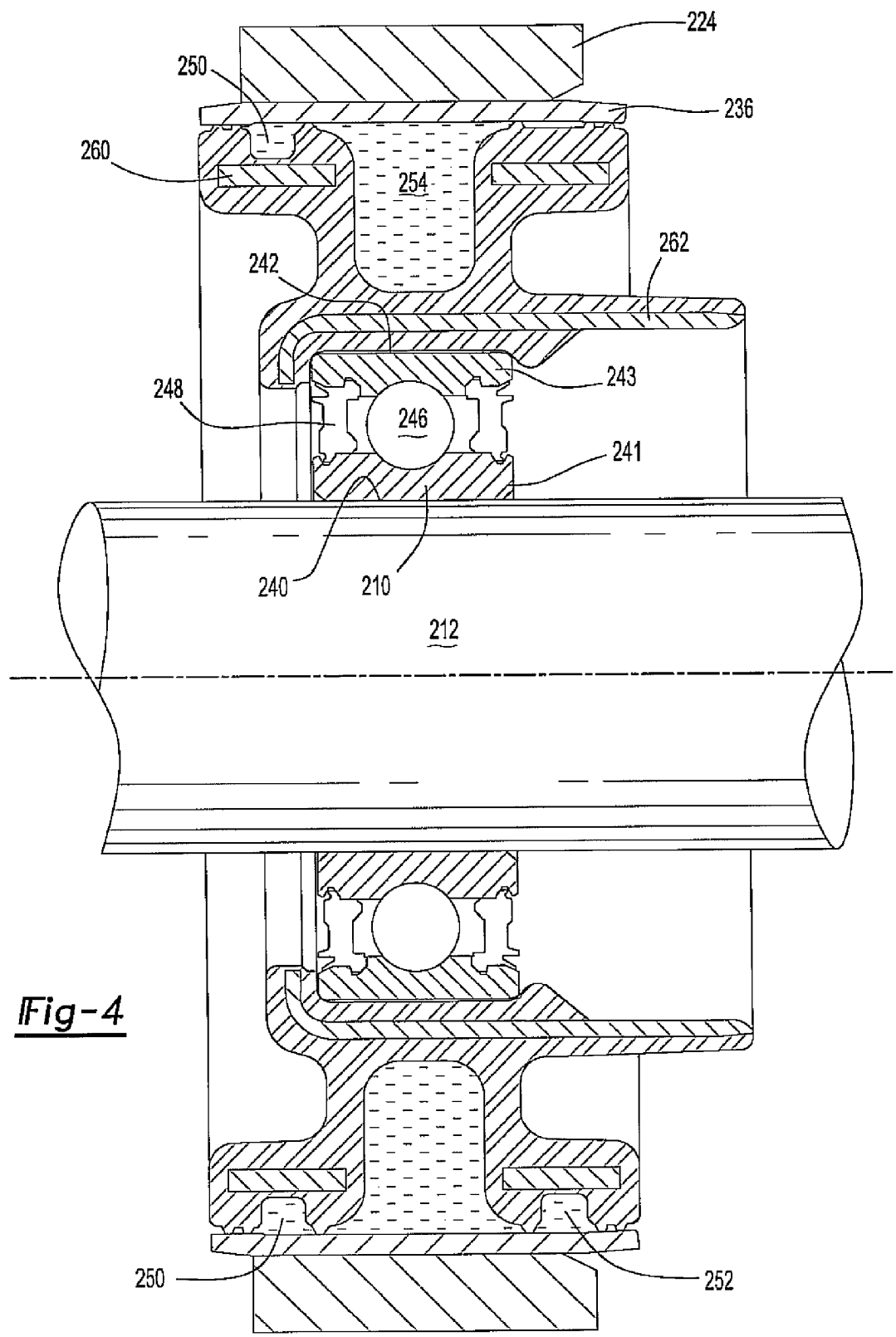
FIG. 4 illustrates a cross-sectional view of the center support holding a prop shaft.

The present invention provides a multiple chamber rubber bushing and center support assembly integrating the use of a plurality of chambers and channels operable to contain a fluid to increase noise dampening.

Center support apparatus 200 as shown in FIGS. 1-4 generally includes a bracket 202, a bushing 204, a center bearing 210, and a seal 230. The bracket 202 is typically comprised of aluminum or other light and durable metal. The bracket 202 is generally circular and includes an inner surface 201 and an outer surface 203. The bracket 202 further includes mounting portions 220a, 220b. The mounting portions 220a, 220b include the apertures 208, 209. The apertures 208, 218 and connection portions 224, 236 are adapted to secure the bracket 202 to the vehicle system to securely mount the prop shaft to the vehicle. The apertures 208, 218 are operable to accept a bolt or other fastener to secure the bracket to the vehicle.

As shown in FIG. 1, a plurality of center mounts 200a, 200b are used to secure the prop shaft 212 to the vehicle. The prop shaft assembly 100, as shown in the present embodiment as shown in FIG. 1, includes two mounting assemblies 200a, 200b.

To assemble the mount assembly 200, a center bearing 210 is press fit into the center of the rubber bushing 204. Subsequently, the bushing 204 having the bearing 210 mounted within is press fit into the annular seal 230. The bearing 210, bushing 204, and seal 230 assembly is then press fit into the bracket 202. Hydraulic fluid is also incorporated within the system either before assembly or after or during to incorporate the fluid within the assembly.

The annular seal 230 includes an outer surface 232 and an inner surface 234. The annular seal 230 is made of either a metal, such as aluminum, or a polymer or polymer-like material, such as rubber. The material of the annular seal 230 must prevent any leakage of the fluid contained within the bushing 204. The annular seal 230 further includes an upper lip 233 and a lower lip 235. The upper lip 233 and the lower lip 235 are incorporated to prevent any movement of the seal 230 within the assembly 200.

The assembly 200 further includes the center bearing 210. The center bearing 210 is generally circular or annular having an inner surface 240 and an outer surface 242. The center bearing 210 further includes a first annular ring 241 and a second annular ring 243. The first and second annular rings 241, 243 are connected by bearing elements 246, 248. When the bearing 210 is mounted within the assembly 200 and the bearing 210 and the surface 240 are in contact with the prop shaft 212, the inner ring 241 is operable to rotate within the assembly 200 typically within the bearing 210. The rotation and movement of the prop shaft 212 generates movement and misalignment of the prop shaft 212 which would ordinarily cause vibration and noise. However, with the inclusion of the hydraulic bushing 204, the noise and vibration are dramatically dampened within the interior of the vehicle. The bushing 204 is generally a molded rubber or other polymer or polymer-like material molded with various metal support structure 260, 262, 264 to further increase strength of the bushing 204. The bushing 204 generally includes an inner surface 264 and a plurality of outer surfaces 265. The plurality of outer surfaces 265 generally lie within the same plane to securely fit within the annular ring 230. The bushing 204 includes an upper curved surface 275. The bushing 204 further includes a lower curved surface 277.

The bushing 204 as shown in FIG. 3 depicts a cross-sectional view of the chamber 254, 256 connected by the channel 250. Hydraulic fluid moves through the channel 250 to connect the chambers 254, 256. As the assembly 200 is moved in accordance with displacement of the prop shaft 212, fluid within the chambers 254, 256 is transferred through the channels 250, 252 to each chamber. The inclusion of four chambers and two channels 250, 252 permits fluid dampening in both the vertical 286 and lateral 288 directions.

Figure 7:
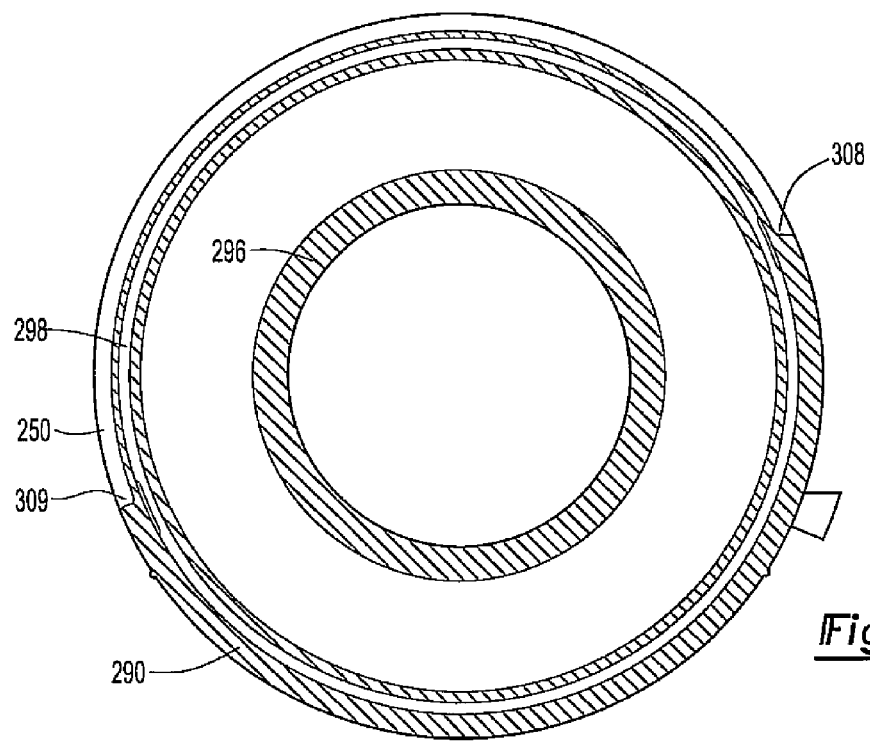
FIG. 7 illustrates a cross-sectional view of the rubber bushing along the sectional line 7-7.

FIG. 5 illustrates a side view of the bushing 204. The bushing 204 as shown includes two channels 250, 252 and four chambers 254, 255, 256, 257. The channel 252 connects the small chambers 255, 257. The channel 250 connects the large chambers 254, 256. Separator ribs or supports 280, 282 separate the large chambers from the small chambers. By way of example, as shown in FIG. 5, the separator structure 280 separates the small chamber 255 from the large chamber 254. Further, the bushing 204 includes an upper surface 284 and a lower surface 286. FIG. 7 illustrates the cross-sectional view along line 7-7 of FIG. 5. FIG. 7 illustrates the channel 250 connecting the small chambers 255, 257. The cross-sectional view also shows cross-sectional areas 290, 296, 298. The channel 250 includes the outlets 308, 309 allowing fluid to enter the small chambers 255, 257 from the channel 250.

Further, the chambers 254, 255, 256, 257 include an open area 250a. The open area 250a is ultimately sealed by the inner surface 234 of the annular ring 230. The seal created by the inner surface 234 of the annular ring 230 prevents any fluid from escaping the system. Further, the channels 250, 255 include open areas 250a, 255a. The open areas 250a, 255a are ultimately sealed by the inner surface 234 of the annular ring 230. The seal created by the inner surface 234 of the annular ring 230 prevents any fluid from escaping the system.

The fluid sealed within the apparatus may be a liquid or gas. The liquid can be an oil, antifreeze solution, water, alcohol or other suitable material.

Figure 8:
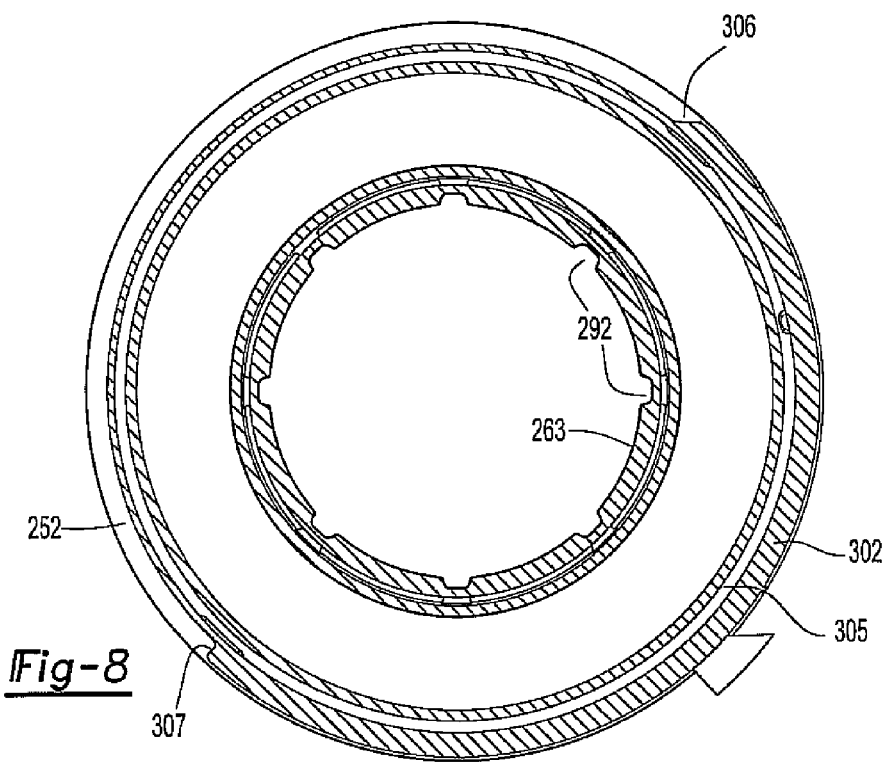
FIG. 8 illustrates a cross-sectional view of the rubber bushing along the sectional line 8-8.

FIG. 8 illustrates the channel connecting the large chambers 254, 256. The channel 252 includes inlet and outlet 306, 307. FIG. 8 further illustrates cross-sectional areas of the bushing 204 including notches 292 of the inner surface 263. FIG. 8 also illustrates further cross-sectional areas 302, 305 of the bushing 204.

In an alternative embodiment, the apparatus contains only 2 chambers connected by 1 channel. If the system only has 2 channels, damping is only provided in either the lateral or vertical directions. Having 4 chambers and 2 channels permits damping and sound/vibration in both the lateral and vertical directions.

The invention is not restricted to the illustrative examples and embodiments described above. The embodiments are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the appended claims.

The invention claimed is:

1. A hydraulic bushing and apparatus for dampening a rotating shaft, the hydraulic bushing and apparatus comprising:
   a bushing being generally circular, the bushing having at least two chambers molded therein, the chambers of the bushing connected by at least one channel, the at least one channel molded in the bushing, the at least two chambers having an open area, the at least one channel having an open area;
   an annular ring mounted to seal around the outer circumference of the bushing, the annular ring sealing the open area of the at least two chambers, the annular ring sealing the open area of the at least one channel, the annular ring securely fit over the at least two chambers and the at least one channel;
   a supply of fluid contained within the at least two chambers and in the at least one channel, the annular ring secure enough to hold fluid within the at least two chambers and the at least one channel;
   a bearing press fit in the center of the bushing, the bearing operable to hold a shaft; and
   wherein the fluid within the at least two chambers and the at least one channel of the bushing is operable to move between the at least two chambers via the at least one channel as a shaft is displaced during vehicle movement.

2. The hydraulic bushing and apparatus as claimed in claim 1 wherein the bushing, the annular ring and the bearing are arranged concentrically.

3. The hydraulic bushing and apparatus as claimed in claim 1 wherein the bushing includes an outer surface and an inner surface.

4. The hydraulic bushing and apparatus as claimed in claim 3 wherein the at least two chambers are disposed on the outer surface of the bushing.

5. The hydraulic bushing and apparatus as claimed in claim 3 wherein the at least one channel is disposed on the outer surface of the bushing.

6. The hydraulic bushing and apparatus as claimed in claim 1 wherein the molded bushing is made of rubber.

7. The hydraulic bushing and apparatus as claimed in claim 1 wherein the molded bushing is made of a polymer or polymer like material.

8. The hydraulic bushing and apparatus as claimed in claim 1 wherein the bushing, annular ring and bearing are concentrically arranged mounted in a bracket, the bracket mounted to a vehicle.

9. The hydraulic bushing and apparatus as claimed in claim 8 wherein the bracket is aluminum.

10. The hydraulic bushing and apparatus as claimed in claim 1 wherein the bushing includes metal structural elements to improve strength of the bushing.

11. The hydraulic bushing and apparatus as claimed in claim 1 wherein the bearing is operable to rotate.

12. The hydraulic bushing and apparatus as claimed in claim 1 wherein the bushing includes an additional two chambers, the bushing including four total chambers.

13. The hydraulic bushing and apparatus as claimed in claim 12 wherein the four chambers are connected by two separate channels.

14. The hydraulic bushing and apparatus as claimed in claim 1 wherein the fluid is a liquid.

15. The hydraulic bushing and apparatus as claimed in claim 1 wherein the annular ring includes an inner surface and an outer surface.

16. The hydraulic bushing and apparatus as claimed in claim 15 wherein the inner surface of the annular ring seals the at least two chambers and the at least one channel.

\* \* \* \* \*